No. 610,880. Patented Sept. 13, 1898.
J. W. PERKINS.
FISHING ROD.
(Application filed Sept. 8, 1897.)

(No Model.)

Witnesses:
Henry W. Darling
S. F. Sutherland

Inventor:
John W. Perkins
per H. Dunham Attorney.

UNITED STATES PATENT OFFICE.

JOHN W. PERKINS, OF BOSTON, MASSACHUSETTS.

FISHING-ROD.

SPECIFICATION forming part of Letters Patent No. 610,880, dated September 13, 1898.

Application filed September 8, 1897. Serial No. 651,007. (No model.)

*To all whom it may concern:*

Be it known that I, JOHN W. PERKINS, a resident of Boston, in the county of Suffolk and State of Massachusetts, have invented a new and useful Improvement in Sea and Deep-Water Fising-Rods, of which the following, taken in connection with the accompanying drawings, is a specification.

My invention relates to an improvement in sea and deep-water fishing-rods; and the objects of my improvement are to provide means for fishing in sea and deep water from boats without tangling the line; also, to prevent wearing of lines, to haul lines in easier than by ordinary methods, and to control the catch.

I attain these objects by means of the mechanism illustrated in the accompanying drawings, in which—

Figure 1:
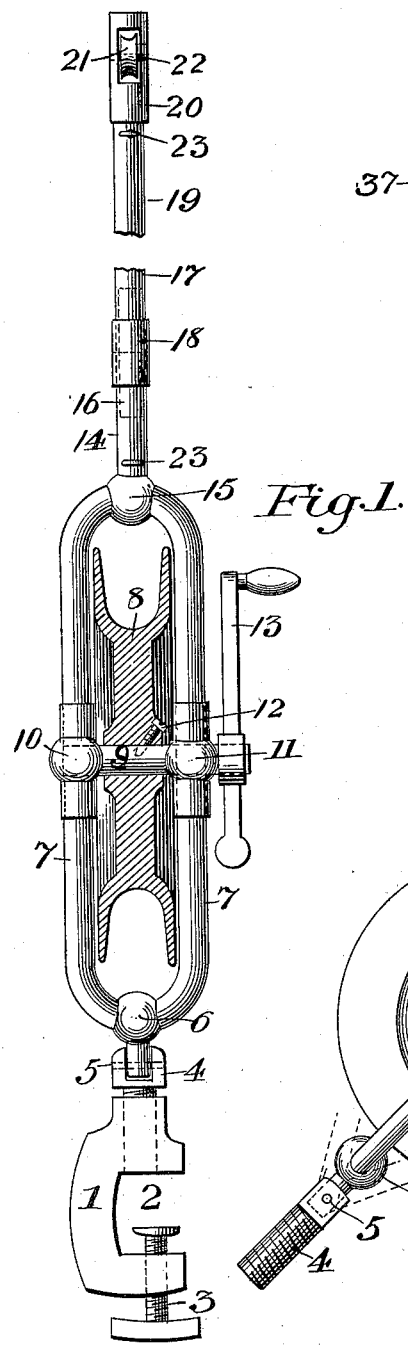
Figure 2:
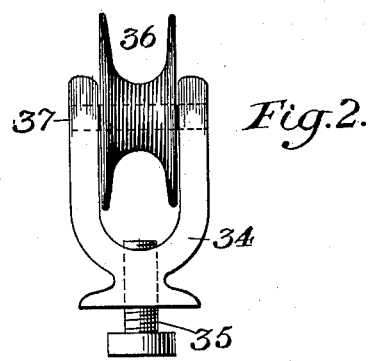
Figure 3:
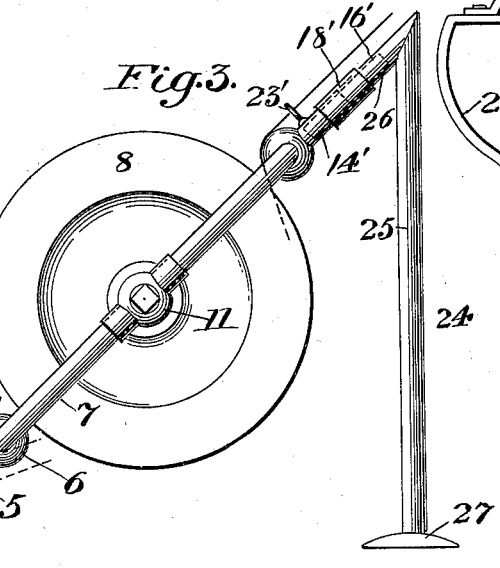
Figure 4:
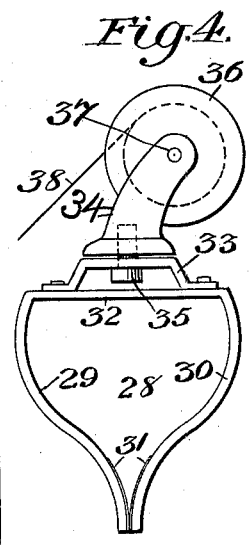

Figure 1 is a vertical view of my invention. Fig. 2 is a detail view. Fig. 3 is a side view. Fig. 4 is a detail view in part section.

Similar numerals denote similar parts throughout the several views.

1 is a screw-clamp, of metal, provided with the opening 2, in the lower part of which is a thumb-screw 3, which actuates said clamp.

4 is a metal holder, which is screwed in the top part of clamp 1, as shown, and as may be desired, and has the knob 6 pivoted in a suitable opening by pivot 5.

7 is an elliptical frame, preferably of tubing, having its lower end fixed in the knob 6.

8 is a reel, which rotates on the axis 9, whereby it is held in the frame 7.

10 and 11 are knobs on each side, respectively, of the frame 7, in which rests the axis 9 of the reel 8.

12 is a screw which fastens the reel 8 upon the axis 9.

13 is a crank on the outer end of the axis 9 for the purpose of turning the reel 8.

14 is a tubular rod-joint provided with a pin 16 inserted in the lower end and having a sleeve 18 fixed on the outer lower end.

19 is the top tubular rod-joint, having the sleeve 20, in which is the sheave 21, turning on the pin 22.

23 are eyelets through which the line passes.

24 is a tubular knee formed of the upright tube 25 and the slanting tube 26. The tube 26 is provided with the sleeve 18' and pin 16' in order to be adjusted with the tubular joint 14.

27 is a shoe at the lower end of the upright tube 25.

28 is a spring-clutch having the curved arms 29 and 30, which are provided with inner rubber tips 31. On the plate 32 of the clutch is fixed the bracket 33.

34 is a frame, which rotates on the swivel 35, which is fixed in the bracket 33.

36 is a sheave, which rotates on the pin 37, which is held in the sides of the frame 34.

38 is a line.

Several tubular rod-joints similar to 14 may be used to make such length of rod as may be desired. The screw-clamp 1 is adjusted on the gunwale of a boat or other suitable place, and the line, which may be on the reel 8, is passed through the eyelets and over the sheave 22 in the top joint and allowed to sink below the surface, as may be desired, with suitable bait and sinker. When the fish is hooked, the line may be hauled in and wound on the reel by means of the crank 13 and the rod swung directly over the boat, so as not to lose the catch, or to put it in any desired place by bringing back the rod on pivot 5, as shown by the dotted line in Fig. 3. When it is desired to use the reel without the upper rod-joints, the clutch 28 is placed upon the side of the boat, the rubber pads 36 resting upon the inner and outer sides. The clamp 1 is fastened on a thwart or other suitable place and the rod-joint 14 fixed in the slanting tube 26 of the knee 24, the foot 27 of which rests on the thwart, and the line 38, passing from the reel 8 through the eyelet 23 over the sheave 36, is allowed, with suitable bait and sinker, to go below the surface of the water. The swivel 35 allows the sheave 36 to move about with the swaying of the line, while cutting or wearing of the gunwale or sides of the boat is avoided. By means of the reel, as arranged with the mechanism, the line can be wound up without any tangle or snarl.

Having described my invention, what I desire to secure by Letters Patent and claim is—

1. In a sea and deep-water fishing-rod, in combination a tubular joint formed as described, provided with an elliptical frame, a rotatable reel in said frame, a holder to which the joint is pivoted and a screw-clamp carried by the holder, all substantially as described and for the purpose set forth.

2. In a sea and deep-water fishing-rod, in combination a tubular joint formed as described, provided with an elliptical frame, a rotatable reel in said frame, a holder to which the joint is pivoted and a screw-clamp carried by said holder, a tubular joint, having a sleeve joined with the tubular joint first described, and joined to another tubular joint, provided with a sheave at the upper end thereof all substantially as described and for the purpose set forth.

In testimony whereof I have signed my name to this specification, in the presence of two subscribing witnesses, on this 27th day of July, A. D. 1897.

JOHN W. PERKINS.

Witnesses:
 H. DUNHAM,
 S. A. SUTHERLAND.